(12) United States Patent
Dreher et al.

(10) Patent No.: US 6,692,063 B2
(45) Date of Patent: *Feb. 17, 2004

(54) WIND STOP DEVICE

(75) Inventors: Martin Dreher, Moeglingen (DE); Hermann Maeurle, Stuttgart (DE); Joerg Riehle, Stuttgart (DE); Hans Riehle, Ludwigsburg (DE)

(73) Assignee: ORIS Fahrzeugteile Hans Riehle GmbH, Moeglingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/412,503

(22) Filed: Apr. 11, 2003

(65) Prior Publication Data

US 2003/0205912 A1 Nov. 6, 2003

Related U.S. Application Data

(63) Continuation of application No. 10/000,388, filed on Nov. 30, 2001, now Pat. No. 6,557,928.

(30) Foreign Application Priority Data

Dec. 4, 2000 (DE) .......................... 100 61 562

(51) Int. Cl.$^7$ ................................. B60J 1/00
(52) U.S. Cl. ................................. 296/180.1
(58) Field of Search .................. 296/180.1, 77.1, 296/217

(56) References Cited

U.S. PATENT DOCUMENTS

| | | |
|---|---|---|
| 3,220,469 A | 11/1965 | Oehmig |
| 4,232,310 A | 11/1980 | Wilson |
| 4,486,302 A | 12/1984 | Jorgensen |
| 4,501,782 A | 2/1985 | Weatherly et al. |
| 4,538,852 A | 9/1985 | Lobo et al. |
| 4,592,571 A | 6/1986 | Baumann et al. |
| 4,850,637 A | 7/1989 | Carlino |
| 5,116,273 A | 5/1992 | Chan |
| 5,195,799 A | 3/1993 | Goetz et al. |
| 5,211,718 A | 5/1993 | Goetz et al. |
| 5,219,201 A | 6/1993 | Goetz et al. |
| 5,301,737 A | 4/1994 | Martin |
| 5,318,337 A | 6/1994 | Goetz et al. |
| 5,338,089 A | 8/1994 | Goetz et al. |
| 5,368,356 A | 11/1994 | Goetz et al. |
| 5,423,589 A | 6/1995 | Pank |
| 5,535,804 A | 7/1996 | Guest |
| 5,535,808 A | 7/1996 | Idesis et al. |
| 5,588,359 A | 12/1996 | Hofmann et al. |
| 5,645,311 A | 7/1997 | Emmer et al. |

(List continued on next page.)

FOREIGN PATENT DOCUMENTS

| | | |
|---|---|---|
| DE | 88 05 994 | 9/1988 |
| DE | 40 39 485 | 5/1992 |

(List continued on next page.)

*Primary Examiner*—Kiran Patel
(74) *Attorney, Agent, or Firm*—Barry R. Lipsitz; Douglas M. McAllister

(57) ABSTRACT

In order to provide a wind stop device for a passenger vehicle with a roll bar, comprising surface elements of the wind stop device and a supporting device for the surface elements of the wind stop device which can be secured on the roll bar, which can be assembled in a simple manner and quickly it is suggested that the supporting device be provided with at least two holding brackets arranged in spaced relationship, wherein the holding brackets are arranged and designed such that they can be abutted on respective bar sections of the roll bar for securing the supporting device on the roll bar.

32 Claims, 5 Drawing Sheets

U.S. PATENT DOCUMENTS

Figure 1:
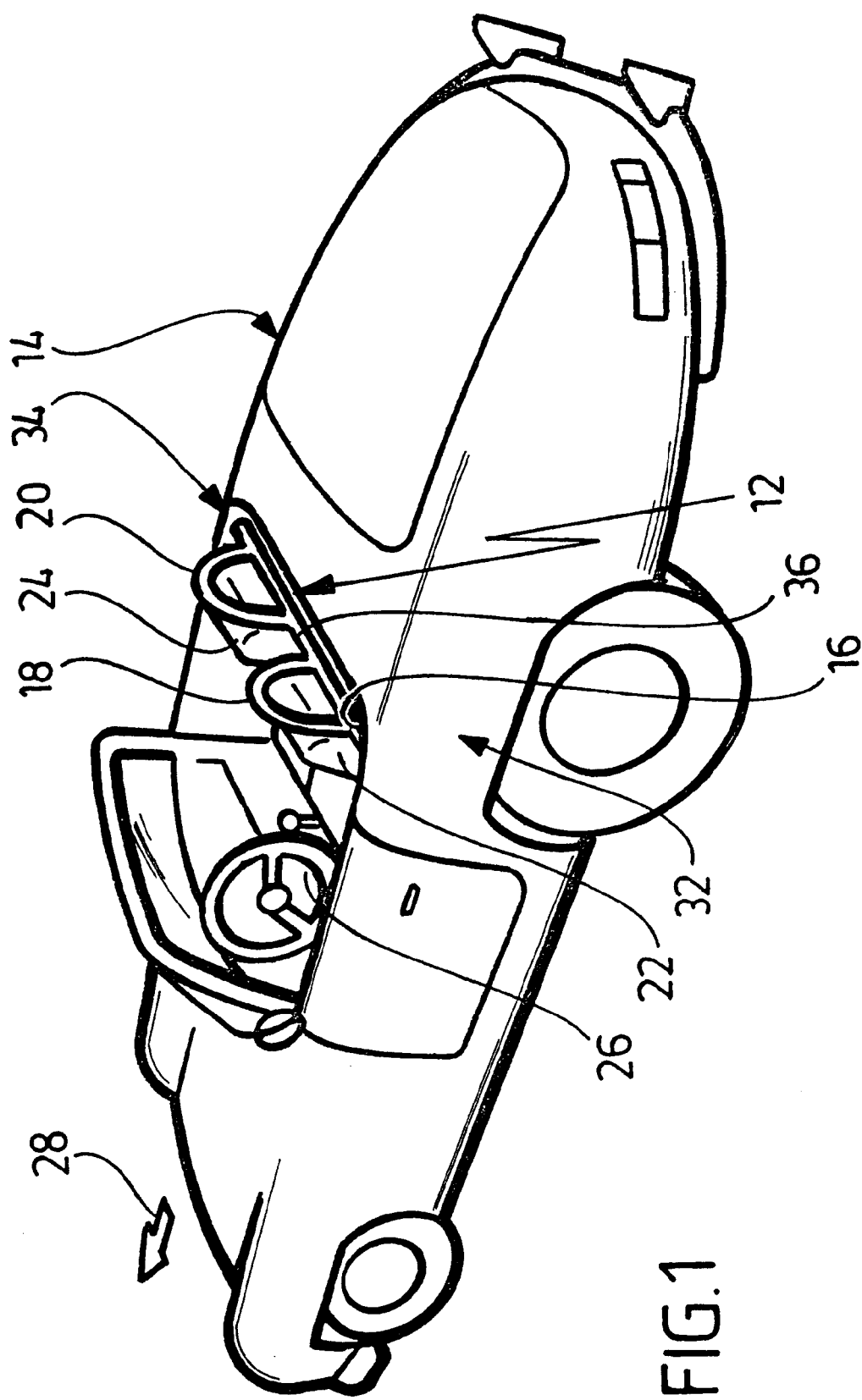

| | | | |
|---|---|---|---|
| 5,702,150 A | 12/1997 | Reuter et al. |
| 5,707,099 A | 1/1998 | Schrader et al. |
| 5,738,404 A | 4/1998 | Stadler et al. |
| 5,810,424 A | 9/1998 | Kuttner et al. |
| 5,819,952 A | 10/1998 | Cook et al. |
| 5,899,521 A | 5/1999 | Pfertner et al. |
| 6,092,860 A | 7/2000 | Zankl et al. |
| 6,109,331 A | 8/2000 | Story, Jr. |
| 6,125,910 A | 10/2000 | Pepperell et al. |
| 6,174,021 B1 | 1/2001 | le Claire et al. |
| 6,179,373 B1 | 1/2001 | Bohm et al. |
| 6,193,298 B1 | 2/2001 | Swersky |
| 6,257,653 B1 | 7/2001 | Swersky |
| 6,263,949 B1 | 7/2001 | Guthrie, Jr. |
| 6,341,812 B1 | 1/2002 | Knoll |
| 6,352,300 B1 | 3/2002 | Beal |
| 6,378,930 B1 | 4/2002 | Brettmann |
| 2002/0027372 A1 | 3/2002 | Currle et al. |
| 2002/0041116 A1 | 4/2002 | Bogisch et al. |
| 2002/0175534 A1 | 11/2002 | Strong |

FOREIGN PATENT DOCUMENTS

| | | |
|---|---|---|
| DE | 41 19 529 | 12/1992 |
| DE | 42 11 965 | 4/1993 |
| DE | 43 15 201 | 2/1994 |
| DE | 42 35 416 | 4/1994 |
| DE | 44 46 764 | 6/1996 |
| DE | 195 02 794 | 8/1996 |
| DE | 195 21 234 | 9/1996 |
| DE | 195 34 584 | 9/1996 |
| DE | 195 16 921 | 11/1996 |
| DE | 196 02 598 | 3/1997 |
| DE | 196 17 702 | 3/1997 |
| DE | 195 36 552 | 4/1997 |
| DE | 195 45 405 | 6/1997 |
| DE | 196 16 448 | 11/1997 |
| DE | 196 32 352 | 2/1998 |
| DE | 196 46 240 | 5/1998 |
| DE | 197 27 510 | 1/1999 |
| DE | 197 28 453 | 1/1999 |
| DE | 197 31 326 | 1/1999 |
| DE | 298 22 230 | 4/1999 |
| DE | 299 13 249 | 12/1999 |
| DE | 199 06 650 | 8/2000 |
| EP | 0 394 675 | 10/1990 |
| EP | 0 490 213 | 6/1992 |
| EP | 0 887 217 | 12/1998 |
| EP | 0 965 470 | 12/1999 |
| EP | 1 010 561 | 6/2000 |
| GB | 235477 | 6/1925 |
| JP | 9 104303 | 4/1997 |
| WO | 97/04976 | 2/1997 |

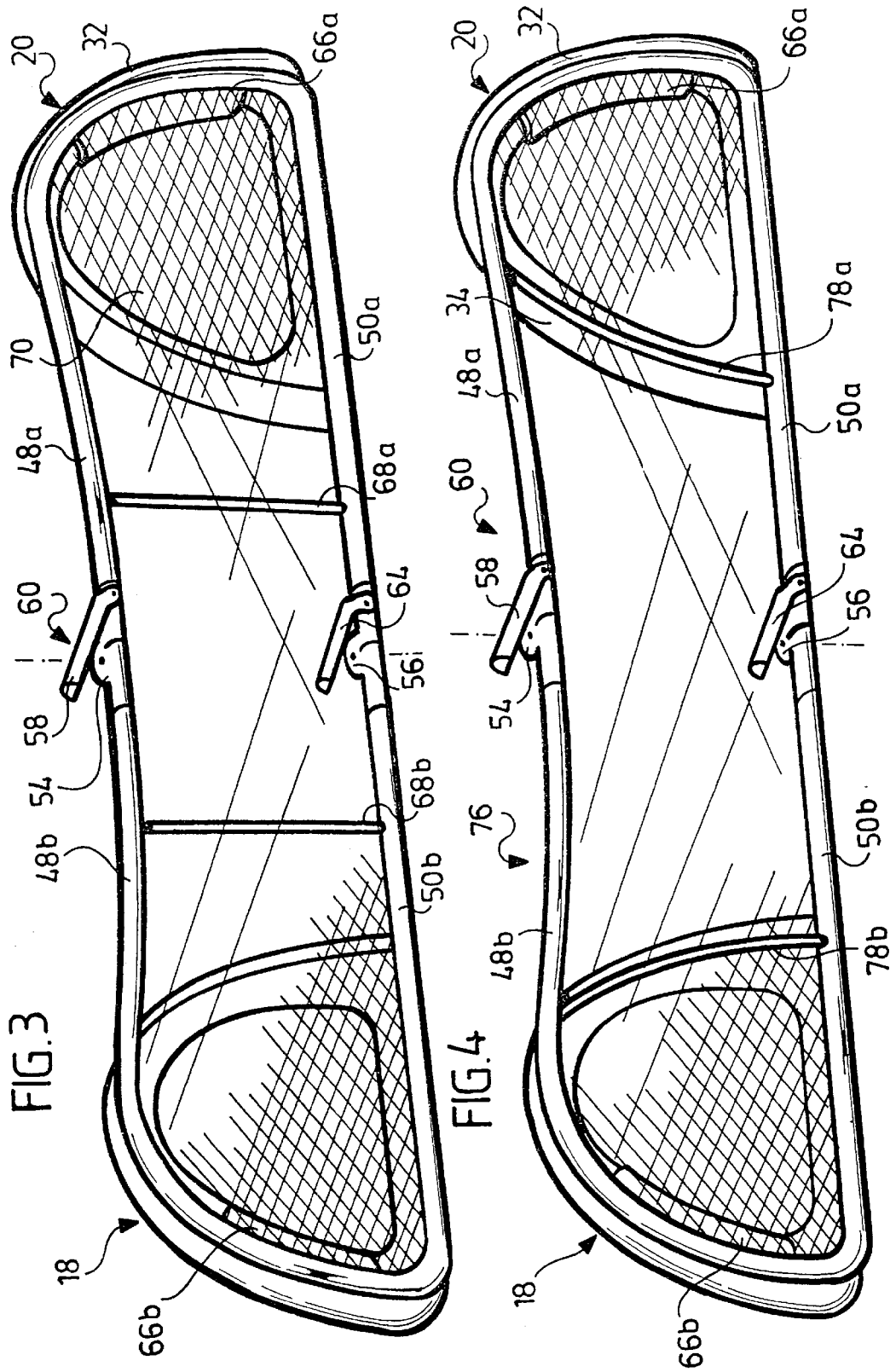

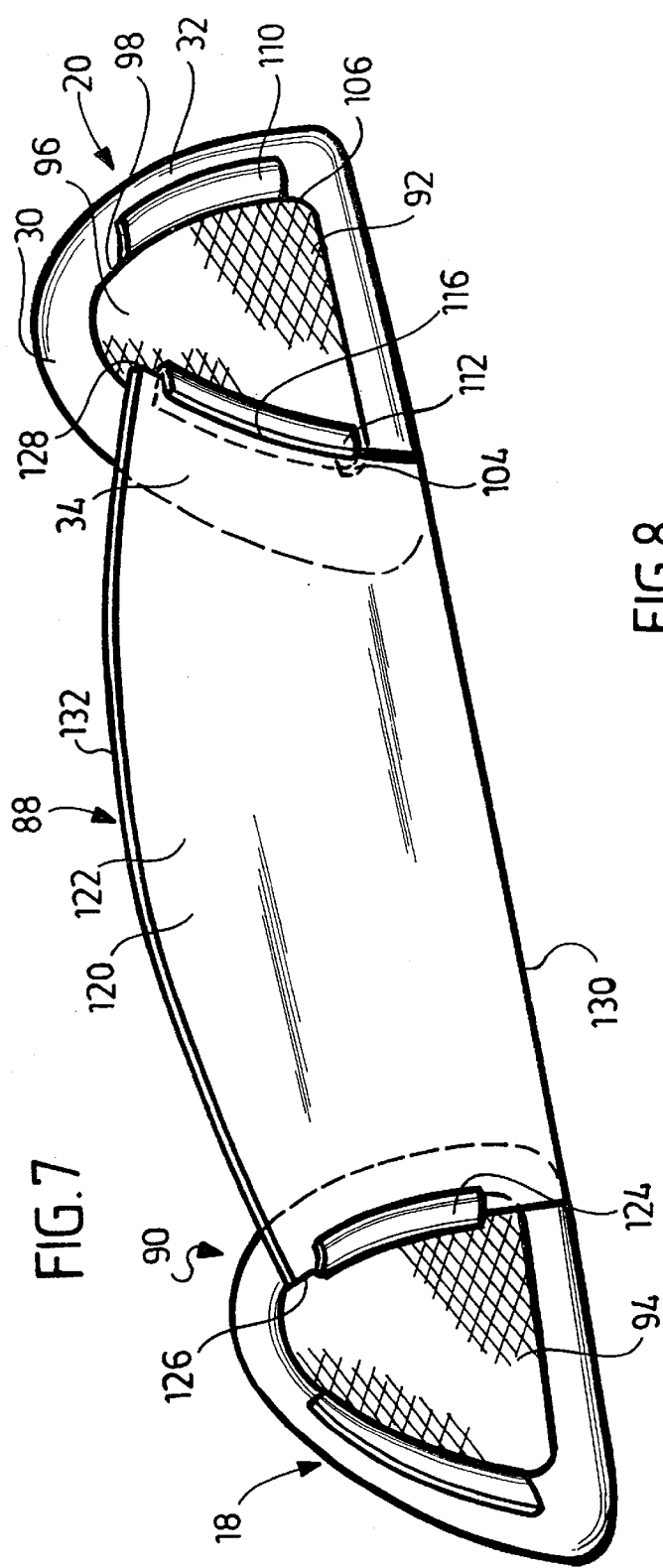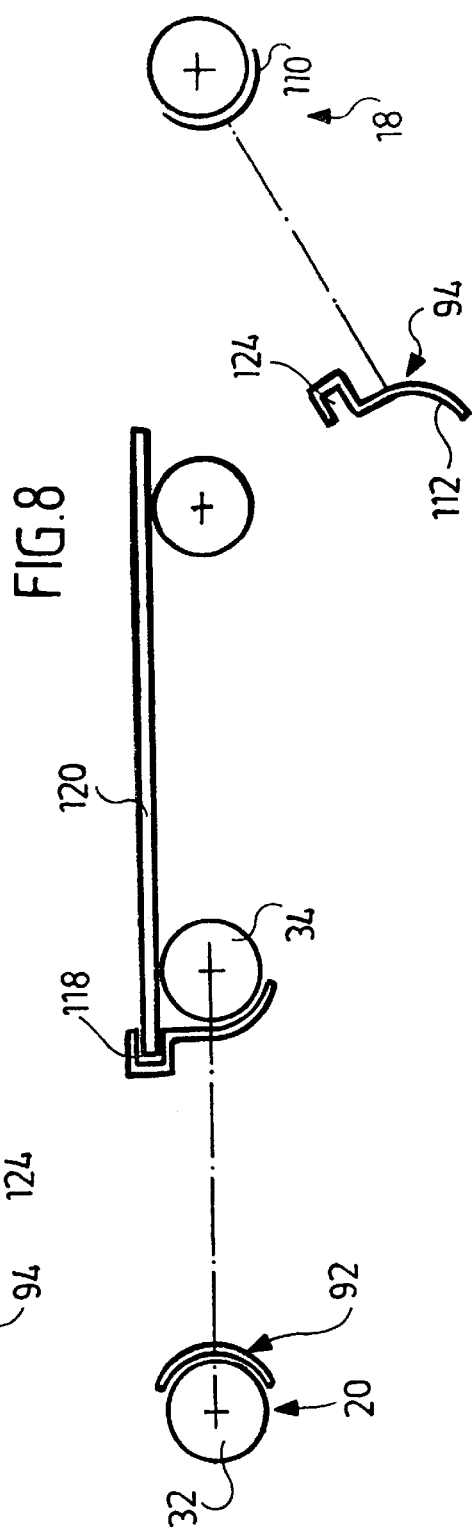

WIND STOP DEVICE

This application is a continuation of U.S. patent application Ser. No. 10/000,388 filed on Nov. 30, 2001 now U.S. Pat. No. 6,557,928.

The invention relates to a wind stop device for a passenger vehicle with a roll bar, comprising surface elements of the wind stop device and a supporting device for the surface elements of the wind stop device which can be secured on the roll bar.

A wind stop device of this type is known, for example, from DE 195 34 584 C1 or DE 196 32 352 A1.

A wind stop device which is secured to a roll bar serves to protect occupants of the passenger vehicle, who are seated in front of the roll bar, from air flowing in from the rear.

Proceeding from this, the object underlying the invention is to provide a wind stop device which can be secured to a roll bar in a simple manner.

This invention is accomplished in accordance with the invention, in a wind stop device of the type specified at the outset, in that the supporting device has at least two holding brackets arranged in spaced relationship and that the holding brackets are arranged and designed such that they can be abutted on respective bar sections of the roll bar for securing the supporting device on the roll bar.

As a result of the fact that the supporting device has holding brackets, the supporting device can be secured on a roll bar which does not need to be equipped beforehand. In particular, the roll bar need not be provided with recesses for accommodating the supporting device. As a result, the roll bar in the case of the inventive wind stop device is, on the one hand, less susceptible, for example, to dirt and the like collecting on it and, on the other hand, recesses or the like do not detract from the esthetic overall impression. Also, roll bars which are already present can be equipped subsequently with an inventive wind stop device.

The inventive wind stop device may be mounted on a roll bar via the holding brackets in a simple and rapid manner and likewise removed again easily.

As a result of the fact that the supporting device has at least two holding brackets arranged in spaced relationship it is possible to hold the supporting device on the roll bar via a clamping force effect, i.e. no form-locking elements need be provided for the connection to the roll bar. The holding brackets are, in particular, of a rigid design, wherein they can, however, have a certain elasticity in order to facilitate such a clamping fixing (for example, like a spring closure).

It is particularly advantageous when a holding bracket is designed such that it can engage around a corresponding bar section at least partially. As a result, a good hold of the supporting device on a roll bar may be achieved, namely, in particular, via a clamping force effect. Since the holding bracket can, to a certain extent, be placed around a corresponding bar section, the assembly of the supporting device is also made easier as a result since a "reference position" is created during the assembly due to the possibility of placing a holding bracket at least partially around a bar section. A bracket may be designed such that it can engage around a roll bar to such an extent that it can also be abutted on the roll bar beyond an apex of a curved surface of the roll bar. For this purpose, the bracket is preferably of an elastic design in order to make it possible for it to be pushed accordingly onto the roll bar. With a bracket pushed on, the area of the roll bar forming the apex represents a barrier against the separation of the bracket away from the roll bar.

It is particularly favorable when a holding bracket is adapted in its shape to the dimensions of the bar section, on which it is intended to abut. As a result, care is taken that the supporting device is held securely on the roll bar, wherein a satisfactory, esthetic, overall impression can be achieved.

In a favorable embodiment from a functional point of view, a holding bracket is of a channel-like design. Since a roll bar generally has bar elements which are of a tubular design with a lining arranged thereon, it is possible, in this way, for a holding bracket to engage at least partially around the bar section in a simple manner.

It is particularly favorable when a holding bracket is of an elastic design and, in particular, is of a flexible design. As a result, it is possible for a clamping force which secures the supporting device on the roll bar to be exerted in a securing position. As a result of the elastic design, the securing position may be reached in a simple manner using force for the elastic deformation, in particular, without special tools needing to be provided.

It is particularly advantageous when a holding bracket projects beyond a wind stop device surface element plane of the supporting device. As a result, the inventive wind stop device may be inserted via the holding brackets into bar elements of the roll bar, wherein the plane of the surface elements of the wind stop device is then offset relative to a plane of the roll bar. As a result, it is not necessary, in particular, to adapt the supporting device to the special configuration of the roll bar, i.e., to adapt it, for example, to the space between two bar elements but rather the adaptation has to be brought about only in relation to the supporting device of the wind stop device.

It is favorable when the at least two holding brackets are arranged at or in the vicinity of oppositely located, lateral ends of the supporting device. As a result, the two outer holding brackets may be abutted on outer bar sections, wherein these outer bar sections are, in particular, oppositely located. As a result, a good clamping force effect may be achieved for securing the supporting device on the roll bar.

If the roll bar has one or more curved elements, it is particularly favorable when a holding bracket is arranged and designed such that it can be abutted on an inner curved side of a respective bar section of the curved element. As a result, a supporting device may be clamped on the curved elements in a securing position. It is then, in particular, very advantageous when the at least two holding brackets are arranged in spaced relationship on the supporting device such that their surface directions with respect to a contact surface on the roll bar point outwards in respectively opposite directions. The holding forces and, in particular, clamping forces of the supporting device in the securing position of the supporting device then point outwards (away from the interior of the vehicle), namely in opposite directions at the respective outer sections of the two bar elements so that a high clamping force effect can be achieved in this way.

In one embodiment, the supporting device is designed in one piece. This may be stored and also mounted in a simple manner.

In this respect, it is favorable when the supporting device has a frame structure in order to bring about a saving on weight, on the one hand, and, on the other hand, in order to hold surface elements of the wind stop device, such as wind deflector webs consisting of netting or fabric which are permeable to air but impervious to wind in a simple manner.

It is particularly advantageous when the supporting device is designed such that its length can be varied parallel to the roll bar. As a result, a space-saving storage of the wind stop device may be achieved when the corresponding length is minimized. On the other hand, such a supporting device may be mounted on a roll bar in a simple manner in that the holding brackets are placed in position, the length is then increased due to a force acting on it until the securing position is reached, and in this securing position the holding brackets abut, in particular, on corresponding bar sections of the roll bar and exert a force on them, namely acting outwards at the respective ends of the roll bar. The supporting device is then held securely on the roll bar due to a clamping force.

It is particularly favorable from a constructional point of view when the supporting structure has one or more swivel joints for the variation in length. As a result of such a swivel joint, sections of the supporting structure may be pivoted relative to one-another and the supporting structure has, as a result, positions, in which its length is minimized (storage position or warehousing position) and a position, in which the length is maximized and in which the supporting device can be fixed on a roll bar due to a clamping force (securing position). The assembly of such a supporting structure on a roll bar may be brought about in a simple and quick manner. Furthermore, swivel joints may be designed to be robust in an inexpensive manner in such a way that their functionality is also not impaired over a longer period of time.

A swivel joint is advantageously arranged at least approximately centrally on a frame structure of the supporting device. As a result, a minimum length of the supporting device may be provided, on the one hand, in the storage position and, on the other hand, the assembly is made easier since the securing position can be reached as a result of the action of symmetric forces.

It is particularly advantageous when in a securing position of the supporting device this can be secured on the roll bar in a clamping manner by means of the at least two holding brackets.

In a variation of one embodiment it is provided for the securing position to be located beyond a dead center with respect to a pivoting position relative to pivotable sections of the supporting device.

It is favorable when the securing position can be locked. As a result, the securing of the supporting device on the roll bar can be fixed.

In a variation of one embodiment, at least one stop element, by means of which sections of a frame structure of the supporting device which are movable relative to one another can be coupled to one another so as to be essentially unmovable, is provided for locking the securing position. The stop element thus blocks the pivoting movement and, as a result, any pivoting back out of the securing position.

In a constructionally simple embodiment, the stop element is designed as a hinged cover flap. Such a hinged cover flap is, in the securing position, placed over adjacent frame sections which are pivotable relative to one another and couples these to one another so as to be essentially unmovable in order to block their pivoting movement relative to one another.

In an alternative variation, the stop element is designed as a sliding stop member which likewise blocks the pivoting movement when it is in a stop position.

It is favorable when one or more struts are arranged between an upper frame section and a lower frame section of the frame structure. These struts bring about a transverse stability of the wind stop device transversely to a surface normal direction of the surface elements of the wind stop device.

In a variation of one embodiment, a supporting strut is designed as a swivel shaft of a swivel joint for the variation in length of the supporting device. Such a supporting strut also has the advantage that it can couple swivel joints in an upper frame section and a lower frame section, whereby a good swivel guidance can be achieved.

In a further variation of one embodiment, which can be alternative or cumulative, supporting struts are arranged and designed such that they are located in the area of bar sections of the wind stop device when the wind stop device is assembled. Such supporting struts are then relatively inconspicuous with an assembled wind stop device and thus also do not impair the esthetic overall impression and, in particular, the view of the driver towards the rear in the rearview mirror is not hindered as a result. If the roll bar is viewed from a side facing away from the assembly side of the wind stop device, these supporting struts are not visible at all.

In a further embodiment, the roll bar comprises at least a first and a second, spaced curved element and the supporting device of a first supporting structure which can be secured on the first curved element and a second supporting structure which can be secured on a second curved element. Therefore, a separate supporting structure is provided for each curved element, wherein corresponding surface elements of the wind stop device may be mounted in the space between the curved elements on the first supporting structure and the second supporting structure themselves.

Advantageously, a surface element of the wind stop device for the associated curved element is held by a supporting structure. The curved element itself has an opening, into which an associated supporting structure can be inserted. Annoying flows of air can flow through this opening of the curved element itself from this area of the vehicle to the vehicle occupants. The surface element of the wind stop device, which is held by the corresponding supporting structure, prevents such annoying flows of air towards vehicle occupants.

Advantageously, a support for surface elements of the wind stop device for the space between the curved elements can be secured between the first supporting structure and the second supporting structure. As a result, the optimum functioning of the wind stop device is ensured. The supporting structures then serve as holding devices for the support.

In a variation of one embodiment, the support for the space between the curved elements is of a disk-like design, for example, a Plexiglas disk. This has the advantage that, on the one hand, a good wind protection can be achieved and, on the other hand, the view of the driver towards the rear is not hindered.

It is particularly favorable for fixing a supporting structure on a curved element when a supporting structure has oppositely located holding brackets for securing it on an associated curved element and also for securing a support between spaced supporting structures. The supporting structure may then be held on the respective curved element by means of such holding brackets, for example, via a clamping effect. The supporting structure may be held in a central plane of curved elements or be offset in relation thereto.

It is particularly advantageous when a holding bracket is provided with a groove which is arranged and designed such that a surface element of the wind stop device can be inserted. The support for surface elements of the wind stop device for the space, which are intended to protect against the entry of streams of air into the space between curved elements, can then be inserted into such grooves.

The arrangement of the groove on the bracket (in one piece or fixed relative to it) then determines the position of the support on the roll bar.

Favorably, the groove and the associated support are designed such that the displaceability of the support in the direction of the interior of the vehicle is limited when a supporting device is assembled on the roll bar and, in particular, is limited downwards. As a result, the wind stop device may be assembled in a simple manner since the final position of the support is predetermined.

It is also favorable when a locking device is provided, by means of which the displacement of the support upwards can be limited in order to be able to fix the support securely on the roll bar. For example, the locking device may comprise one or more detent noses which are formed on the support and which can engage in detent recesses on the supporting structures.

Figure 2:
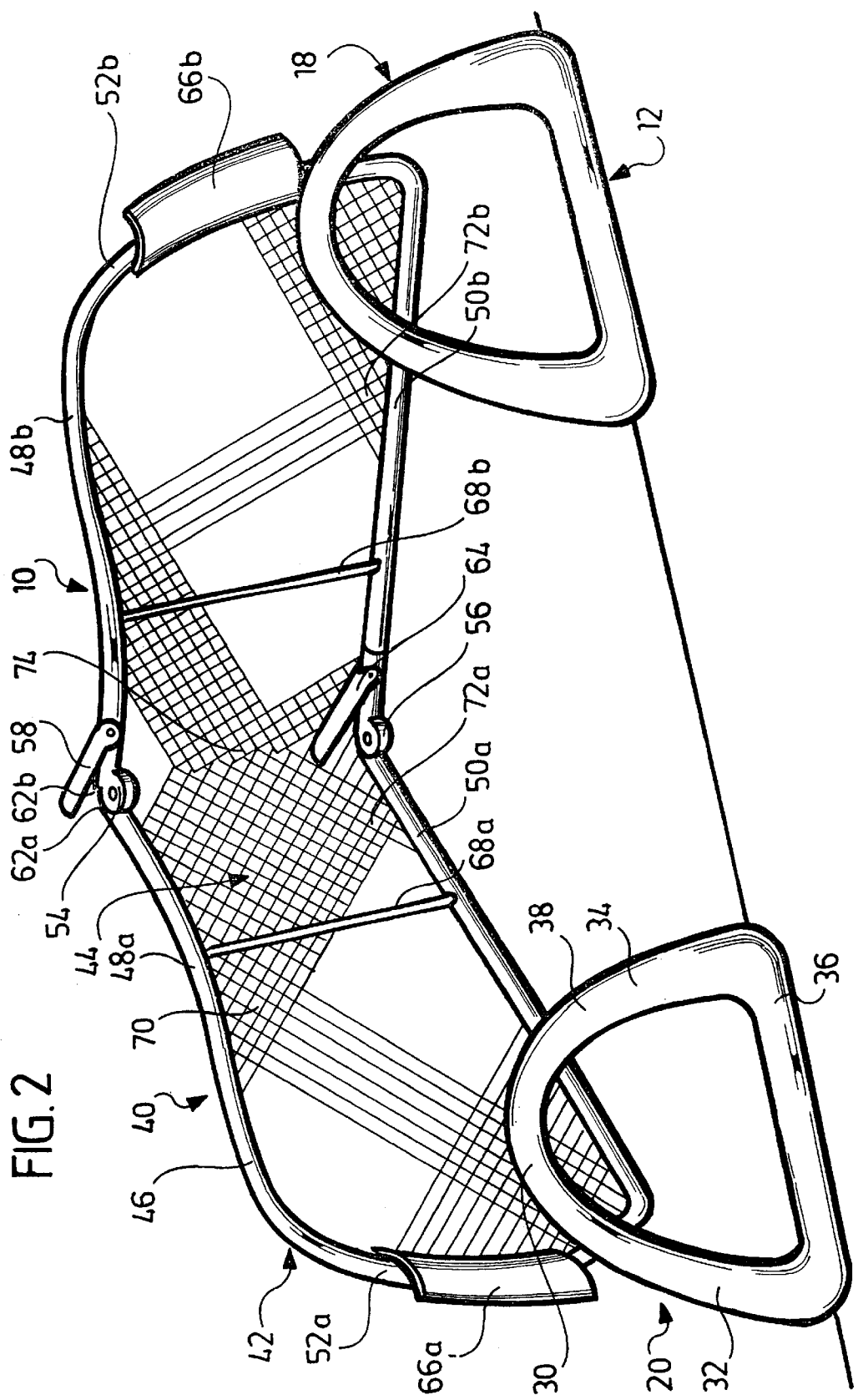
Figure 5:
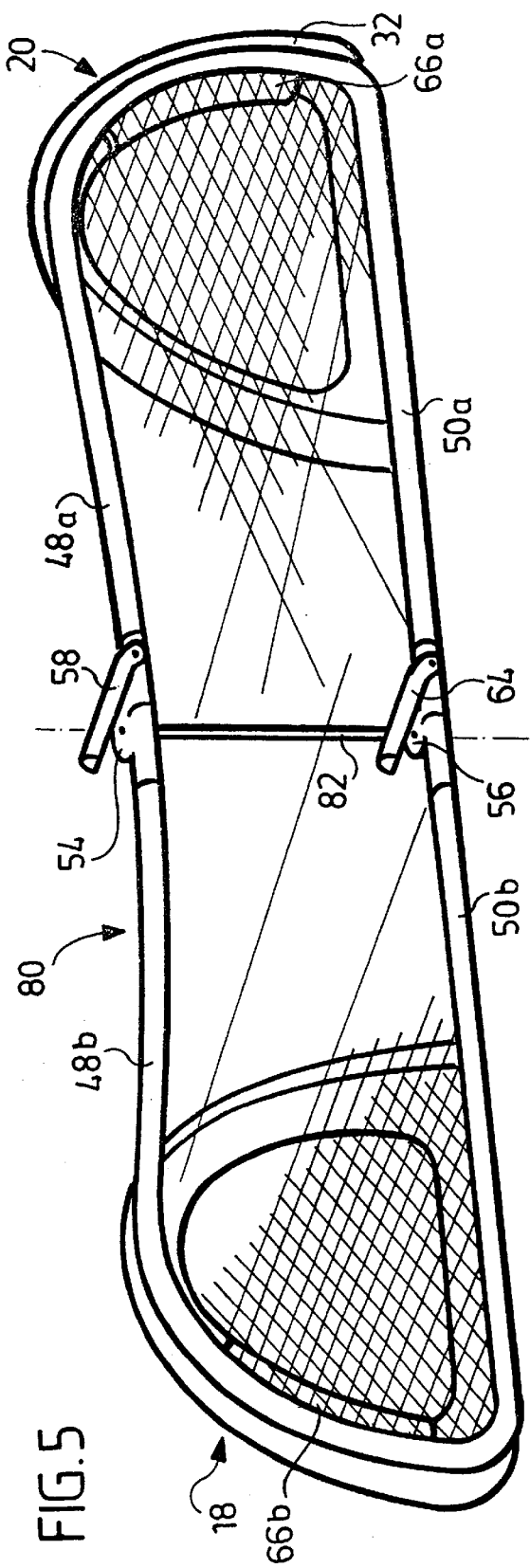
Figure 9:
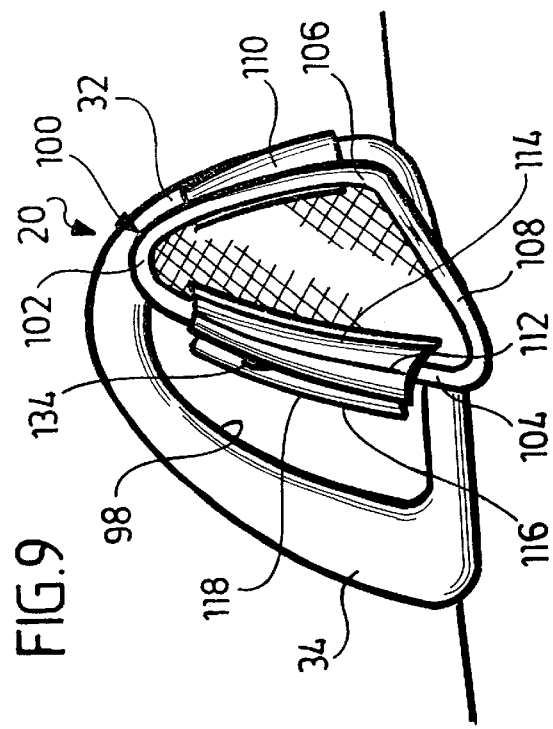
Figure 6:
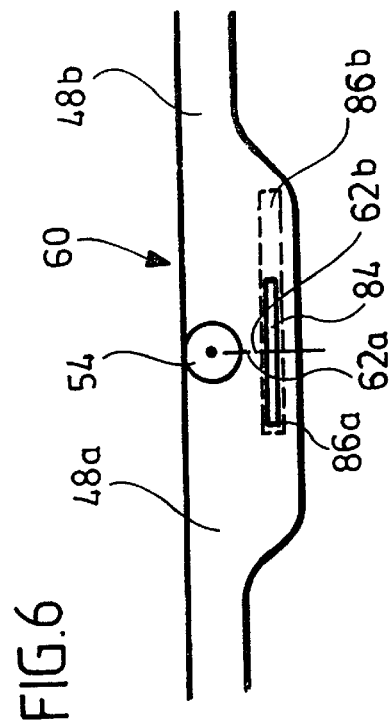

The following description of preferred embodiments serves to explain the invention in greater detail in conjunction with the drawings. These show:

FIG. 1 a perspective view of a passenger vehicle with a roll bar, on which the inventive wind stop device can be secured;

FIG. 2 a first embodiment of a wind stop device prior to its assembly on a roll bar;

FIG. 3 the wind stop device according to FIG. 2 after assembly on the roll bar;

FIG. 4 a variation of the wind stop-device according to FIG. 3;

FIG. 5 a further variation of one embodiment of a wind stop device;

FIG. 6 a schematic view of a locking device for securing an inventive wind stop device on a roll bar;

FIG. 7 a second embodiment of a wind stop device in a perspective view, wherein the wind stop device is assembled on a roll bar;

FIG. 8 a schematic illustration with respect to the assembly of the wind stop device according to FIG. 7 and FIG. 9 a supporting structure of the wind stop device according to FIG. 7 prior to the final assembly on a bar element of a roll bar.

One embodiment of an inventive wind stop device, which is illustrated in FIG. 2 and designated as a whole as 10, can be secured to a roll bar of a vehicle body 14 of a passenger vehicle, this roll bar being designated as a whole as 12 in FIGS. 1 and 2. The passenger vehicle is preferably a convertible vehicle.

The roll bar 12 projects upwards beyond a belt line or railing line 16 of the vehicle body 14 and comprises two curved elements 18 and 20 arranged at a distance in relation to one another. These are arranged next to one another behind respective back rests 22 and 24 of seats of the convertible vehicle arranged in a passenger compartment 26.

In a variation of one embodiment, the curved elements 18 and 20 are, in principle, of the same design, for example, in the shape of a U-shaped arch, the arm opening of which points downwards towards the convertible vehicle. They extend in a plane transverse to a longitudinal direction 28 of the vehicle body 14.

A curved element 18, 20 comprises a first curved section 30 in the form of a center arm, which is adjoined to the left and right, respectively, by a second curved section 32 and a third curved section 34 in the form of side arms. The side arms 32 and 34 are again connected to a base support 36 of the roll bar 12. The base support 36 extends between the curved elements 18 and 20 (this is not shown in FIG. 2). In the variation shown in FIGS. 1 and 2, the base support 36 also extends between the side arms 32 and 34, i.e., the U-shaped curved elements 18, 20 are D-shaped in the variation shown, taking the base support into account.

The curved elements 18, 20 are provided with a lining 38.

A first embodiment of a wind stop device 10, which is designated in FIG. 2 as a whole as 40, comprises a supporting device 42 which can be secured to the roll bar 12 and which holds surface elements 44 of the wind stop device. The supporting device 42 comprises a frame structure 46 with upper frame sections 48a, 48b and lower frame sections 50a, 50b. When the supporting device 42 is mounted on the roll bar 12, the lower frame sections 50a, 50b face the base support 36 of the roll bar 12. A side bar 52a, 52b is arranged each time between the associated upper frame section 48a and lower frame section 50a or 48b, 50b.

The upper frame sections 48a and 48b are pivotable relative to one another via a swivel joint 54 with a swivel axis transverse to the upper frame sections 48a, 48b. The swivel joint 54 is preferably arranged essentially centrally on the frame structure 46. A swivel joint 56 is likewise provided, by means of which the lower frame sections 50a and 50b can be pivoted relative to one another, wherein the swivel joints 54 and 56 are arranged and aligned with respect to one another such that they have a common swivel axis.

A length of the supporting device 42 with respect to the plane, in which the curved elements 18, 20 of the roll bar 12 are located, may be altered by means of the swivel joints 54, 56. This alteration in the length coincides with an alteration in the depth extension of the supporting device 42 transversely to the specified plane: If the depth extension is minimal, the length of the supporting device 42 in the specified plane is at a maximum and vice versa.

A stop element 58 is provided to block the pivotability of the upper frame sections 48a, 48b relative to one another. In the embodiment shown in FIG. 2, the stop element 58 is designed as a hinged cover flap which is arranged on the upper frame section 48b and is mounted so as to be pivotable with a pivot axis transverse to the upper frame section 48b and transverse to the swivel axis of the swivel joint 54. The flap is of a channel-like design with the channel opening downwards and this is adapted to an outer surface of the upper frame section 48a in the area of the swivel joint 54. In a parallel position relative to the upper frame section 48b, the flap 58 projects beyond the upper frame section 48b and can, when the upper frame sections 48a and 48b are in alignment at least in the area of the swivel joint 54, abut on the upper surface of the upper frame section 48a. As a result, the return pivotability of the upper frame sections 48a, 48b relative to one another is blocked and as a result of the stop element 58 a securing position 60 (FIG. 3) of the supporting device 42 can be locked.

This securing position 60 corresponds essentially to a position, in which the supporting device 42 has a maximum length with respect to the plane, in which the curved elements 18 and 20 are located. In a variation of one embodiment, which is shown in FIGS. 2 and 3, the securing position 60 is defined by a dead center of the pivotability of the upper frame sections 48a and 48b relative to one another, at which an end face 62a of the upper frame section 48a butts on an end face 62b of the upper frame section 48b and thus any further pivotability of the upper frame sections 48a and 48b relative to one another is blocked.

The lower frame section 50b is likewise provided with a stop element 64 which is, in principle, of the same design and arranged the same as just described on the basis of the upper frame sections 48a and 48b for the stop element 58. Alternatively, it may be provided for the stop element 64 to be arranged on the lower frame section 50a.

A holding bracket 66a, 66b is arranged on each of the side bars 52a and 52b of the supporting device 42 and these holding brackets are likewise of a channel-like design with a channel opening which points outwards. The holding brackets 66a, 66b are each adapted to the second curved sections 32 of the curved elements 18 and 20 in their shape so that a holding bracket 66a or 66b can abut on an inner side of the second curved section 32 of the associated curved element 18 and 20, respectively, and can engage partially around the associated curved element 18, 20 at the second curved section 32. The holding brackets 66a, 66b are preferably produced from an elastic material so that they have, in particular, a spring action, by means of which the supporting device 42 can be clamped on the roll bar 12 via the holding brackets 66a, 66b.

In the embodiment shown in FIG. 2, a supporting strut 68a is arranged between the upper frame section 48a and the lower frame section 50a and a supporting strut 68b between the upper frame section 48b and the lower frame section 50b to the left and right, respectively, of the swivel joint 54 at a distance to it and preferably symmetric to the swivel axis. The supporting struts 68a and 68b connect the upper frame sections 48a, 48b to the lower frame sections 50a, 50b and increase the transverse stability of the supporting device as a result.

The surface elements 44 of the wind stop device are formed, in particular, by a wind deflector web 70 which is preferably produced from a slack material not resistant to bending which is, on the other hand, produced from a netting or fabric permeable to air but not pervious to wind. This wind deflector web 70 is arranged and formed on the supporting device 42 such that it does not hinder the pivotability of the frame sections 48a, 48b and 50a, 50b relative to one another and, on the other hand, is essentially tensioned in the securing position 60 when the supporting device 42 is assembled.

This may be achieved, for example, due to the fact that a first wind deflector web 72a is clamped between the upper frame section 48a and the lower frame section 50a and a second wind deflector web 72b is clamped between the upper frame section 48b and the lower frame section 50b, wherein the two wind deflector webs 72a and 72b have mesh directions which meet one another at an angle in the area of the swivel axis of the swivel joints 54, 56. The wind deflector webs 72a and 72b are woven to one another in the area 74, in which they meet one another. In this respect, the material of the wind deflector web 72a and 72b is, in particular, elastic in order not to hinder the relative pivotability of the frame structure 46.

An alternative possibility would be to see to it that in the area 74 the wind deflector web 72 forms a pocket which facilitates the pivotability of the frame structure 46 and, in particular, facilitates a folding together of the frame structure 46 and, on the other hand, allows tensioning of the wind deflector web 70 in the securing position 60.

The inventive wind stop device functions as follows:

The wind stop device 40 may be stored in a space-saving manner in that the frame structure 46 is pivoted such that the upper frame sections 48a and 48b face one another and are aligned essentially parallel to one another. The length of the supporting device 42 is then reduced to essentially half its maximum length and the depth of the supporting device 42 to essentially double its minimum depth.

In order to secure the supporting device 42 on the roll bar 12, the frame structure 46 is folded open and, in particular, folded open to such an extent that the holding brackets 66a and 66b may be abutted on inner sides of the second curved sections 32 of the respective curved elements 18 and 20. The frame sections 48a, 48b and 50a, 50b are then pivoted further relative to one another with the use of force until the securing position 60 is reached. Since the holding brackets 66a and 66b are formed from an elastic material, these exert a force on the associated second curved sections 32 of the respective curved elements 18 and 20 in the securing position 60, wherein this force is directed outwards. The supporting device 42 and, with it, the wind stop device 40 is held in a clamping manner on the roll bar 12 as a result, as shown in FIG. 3.

By locking the stop elements 58 and 60, the securing position 60 is locked and therefore the holding position of the supporting device 42 on the roll bar 12 is locked.

As a result of the wind stop device 40 being secured on the roll bar 12 by clamping, the latter need not be equipped beforehand for holding a wind stop device. The wind stop device 40 may also be mounted in a simple manner on the roll bar 12 and also removed again in a simple manner in that the steps specified above are carried out in the reverse order. The wind stop device 40 may also be stored in a space-saving manner.

In the embodiment shown, the wind stop device 40 is secured on the roll bar 12 at its side facing away from the passenger compartment 26. As a result, the wind stop device 40 is not located in the passenger compartment 26, whereby the risk of injury during accidents is reduced.

In principle, the inventive wind stop device may, however, also be mounted on any side of the roll bar 12.

A variation of the wind stop device 40 according to FIG. 2 and FIG. 3 is designated in FIG. 4 as a whole as 76. This wind stop device 76 is, in principle, of the same design as the wind stop device 40 and functions in the same way as it. The same elements have therefore been designated with the same reference numerals.

The wind stop device 76 differs from the wind stop device 44 due to the fact that a supporting strut 78a, which is arranged between the upper frame section 48a and the lower frame section 50a, is of a curved design and adapted in its shape to the third curved section 34 of the curved element 20. Furthermore, the supporting strut 78a is arranged such that it is located in the area of the curved element 20 when a supporting device 42 is mounted. The curved element 20 then covers the supporting strut 78a. The supporting strut 78b is arranged and designed between the upper frame section 48b and the lower frame section 50b in a similar way.

In a further variation 80 of a wind stop device which is shown in FIG. 5, a supporting strut 82 is formed by a swivel shaft between the swivel joint 54 and the swivel joint 56, i.e. the swivel joint 54 on the upper frame sections 48a, 48b and the swivel joint 56 on the lower frame sections 50a and 50b are supported on one another. Otherwise, the wind stop device 80 functions as described above.

Alternatively to a cover flap as stop element 58 and 64, respectively, a slide means 84 can also be provided, as shown schematically in FIG. 6, and this is guided in a groove 86a of the upper frame section 48a and in a groove 86b of the upper frame section 48b. Such a slide means 84 can, in particular, be integrated into the frame structure 46 in such a manner that it is not noticeable and therefore the esthetic overall impression is not impaired by stop elements. The grooves 86a and 86b are arranged such that they are in alignment with one another in the securing position 60 so that the slide means can be displaced from one upper frame section, for example, the upper frame section 48b into the other frame section, for example, from the upper frame section 48a, wherein the slide means is then partially located in the groove 86a and partially in the groove 86b and therefore any further pivoting of the upper frame sections 48a and 48b is blocked, i.e. the securing position 60 is locked.

The slide means 84 is guided in the groove 86b, in particular, so as to be secured against loss and in such a manner that it can dip completely into it in order not to hinder the pivoting movements prior to reaching the securing position 60.

The lower frame sections 50a and 50b may also be locked to one another in the same way.

In an alternative embodiment, it may be provided for the securing position to be located beyond a dead center of the pivoting movement of the frame structure 46.

Ina second embodiment of an inventive wind stop device, which is designated as a whole as 88 in FIG. 7, a supporting device designated as a whole as 90 comprises a first supporting structure 92 which can be secured to the curved element 20 and a second supporting structure 94 which can be secured to the curved element 18. The first supporting structure 92 and the second supporting structure 94 are, in principle, of the same design but in mirror symmetry to one another. In the following, only the first supporting structure 92 will therefore be described in greater detail.

This holds a wind deflector web 96 which is intended to cover an opening 98 of the curved element 20. Accordingly, the first supporting structure 92 is adapted to the curved sections 30, 32 and 34 of the curved element 20, namely to their inner sides (FIG. 9). The first supporting structure 92 has, for this purpose, a frame 100 with a central arm 102, side arms 104 and 106 and a connecting arm 108 between the side arms 104 and 106. The wind deflector web 96 is held on these arms 102, 104, 106 and 108. The first supporting structure 92 with its arms is designed such that the opening 98 can be covered essentially completely.

A holding bracket 110 is arranged on the side arm 106 and this is, in principle, of the same design as the holding bracket 66a described above in conjunction with the first embodiment. The holding bracket 110 serves to abut the first supporting structure 92 on an inner side of the second curved section 32, wherein this curved section 32 faces an outer side of the convertible vehicle.

A holding bracket 112 is arranged on the side arm 104 of the first supporting structure 92 and has a channel-like element 114 which serves to abut on an inner side of the third curved section 34, wherein this third curved section 34 faces the interior of the convertible vehicle. The holding bracket 112 is produced from an elastic material, in particular, at least in the area of the channel-like element 114 so that the first supporting structure can be placed on the curved element 20 by means of the holding bracket 110 and the channel-like element 114 can be deformed elastically for placing the holding bracket 112 in position in such a manner that the obstruction by the third curved section 34 can be overcome and, subsequently, the first supporting structure 92 is held in a clamping manner on the curved element 20. A compensation of tolerances may, in particular, also be achieved, for example, in relation to production tolerances.

Furthermore, the holding bracket 112 has a groove element 116 connected, in particular, in one piece with it, this groove element being arranged so as to face the other curved element 18 when a first supporting structure 92 is inserted and thereby being located offset to the plane of the curved elements 18, 20. A groove 118 of the groove element 116 extends transversely to a spacing direction between the curved elements 18 and 20. A support 120 may be inserted into this groove 118, this support bearing surface elements 122 of the wind stop device or itself representing a surface element of the wind stop device.

When the second supporting structure 94 is inserted into the curved element 18, a corresponding groove 124 of this second supporting structure 94 faces the groove 118. The support 120 may then be inserted into the grooves 118 and 124 in the space between the curved elements 18 and 20.

The structure 120 and the grooves 118 and 124 are, in particular, designed such that any displacement of the support 120 downwards is limited; the support 120 can be fixed in its movability downwards, towards the base support 36 of the roll bar 12, namely, in particular, by a stop which is formed by the interaction between the support 120, when it is inserted into the grooves 118 and 124, and these grooves.

For example, the grooves 118 and 124 are, for this purpose, of a curved design and arranged in mirror symmetry to one another in relation to the first supporting structure 92 and the second supporting structure 94. The support 120 is likewise of a curved design at its end faces 126, 128, namely in such a manner that a lower end face 130 is shorter than an upper end face 132. As a result, the support 120 may be inserted into the grooves 124 and 118, respectively, fixed on the curved elements 18 and 20, respectively, and displaced downwards but its displaceability is limited from a certain position onwards.

In order to lock the displacement of the support 120 upwards, a locking device is provided. For this purpose, the grooves 118, 124 are provided, for example, with recesses 134 (FIG. 9), into which locking noses of the support 120 can engage. Other locking means can also be provided, such as, for example, form-locking means for fixing the support 120 on the supporting structures 92, 94.

The support 120 may be formed, in particular, by a disk, such as, for example, a Plexiglas disk. However, a frame structure with a wind deflector web fixed thereon may also be provided.

In the embodiment according to FIG. 8, the surface elements 96 of the wind stop device held on the supporting structures 92, 94 are arranged so as to be offset in relation to the surface elements of the wind stop device which are held on the support 120 or formed by it. It may, however, also be provided for all these surface elements of the wind stop device to be located so as to be a really flush in relation to one another (not shown in the drawings). As a result, a pleasing, esthetic overall effect can be achieved and, for example, the wind stop device can be adapted to vehicle body shapes.

A supporting structure 92, 94 may be designed, in particular, as a one-piece plastic injection-molded part, wherein the associated surface element of the wind stop device is formed in one piece on this injection-molded part (no netting or fabric is then provided as surface element of the wind stop device).

In the embodiment shown in FIG. 7, the wind stop device 88 is therefore in three parts: The first supporting structure 92 is provided for the curved element 20, the second supporting structure 94 for the curved element 18 and the support 120, which is held by the two supporting structures 92 and 94, for the space between the curved elements 18 and 20.

It may also be provided for the supporting device to be provided, for its fixing, with brackets which engage at least partially around the curved elements 18, 20 on their respectively opposite outer sides. The supporting structure for a surface element of the wind stop device between the curved elements 18 and 20 is then separate from the supporting structures for the respective surface elements of the wind stop device for the curved elements 18, 20.

The inventive wind stop device 88 may be secured on the roll bar 12 as follows:

The holding bracket of a supporting structure, for example, the holding bracket 110 of the second supporting structure 94 is placed against the inner side of the second curved section 32 of the curved element 18 and the second supporting structure 94 is then turned towards the third curved section 34 (FIG. 8). As has been described above, the holding bracket can then be fixed on the third curved section 34 in that this is deformed elastically and, after overcoming the obstruction, the elastic deformation is released and, subsequently, the second supporting structure 94 is held on the curved element 18 in a clamping manner.

As shown in FIG. 8, it may also be provided for a supporting structure to be held on a curved element not in a clamping manner but rather to only rest on it and for the final fixing to be brought about via the structure 120.

The procedure for the first supporting structure 92 is as just described for the second supporting structure 94. Subsequently, the grooves 118 of the first supporting structure 92 and 124 of the second supporting structure 94 are aligned flush with one another, namely in a plane parallel to the planes of the curved elements 18 and 20. The support 120 for the surface elements of the wind stop device can then be inserted.

In the embodiment shown in FIG. 8, the support 120 prevents any turning back of the supporting structures 92 and 94 away from the supporting structure 120 and so this brings about the final fixing of the supporting device 90 on the roll bar 12 after insertion into grooves 118 and 124.

What is claimed is:

1. A wind stop device for a passenger vehicle comprising:
    wind stop surface elements;
    a support for the surface elements, said support securable on a passenger vehicle roll bar by at least two spaced apart holding brackets arranged on the support;
    said holding brackets abutable on respective bar sections of the roll bar for securing the support on the roll bar.

2. The wind stop device as defined in claim 1, wherein said holding brackets are adapted to at least partially engage around their respective bar sections.

3. The wind stop device as defined in claim 1, wherein said holding brackets are shaped in accordance with the dimensions of their respective bar sections.

4. The wind stop device as defined in claim 1, wherein said holding brackets have a substantially channel-like design.

5. The wind stop device as defined in claim 1, wherein said holding brackets are elastic.

6. The wind stop device as defined in claim 1, wherein said holding brackets project beyond a surface element plane of the support.

7. The wind stop device as defined in claim 1, wherein the at least two holding brackets are arranged at or in the vicinity of oppositely located lateral ends of the support.

8. The wind stop device as defined in claim 1, wherein:
    the roll bar comprises one or more curved elements; and
    the respective bar sections for the holding brackets comprise inner curved sides of the curved elements.

9. The wind stop device as defined in claim 8, wherein the at least two holding brackets point outwardly in opposite directions in their surface normal direction with respect to corresponding contact surfaces on the roll bar.

10. The wind stop device as defined in claim 1, wherein the support is a unitary support.

11. The wind stop device as defined in claim 10, wherein the support has a frame structure.

12. The wind stop device as defined in claim 10, wherein the length of the support is variable parallel to the roll bar.

13. The wind stop device as defined in claim 12, wherein the support has one or more swivel joints for varying said length.

14. The wind stop device as defined in claim 13, wherein a swivel joint is arranged at least approximately centrally on a frame structure of the support.

15. The wind stop device as defined in claim 10, wherein the at least two holding brackets are adapted to clamp to their respective bar sections of the roll bar to maintain the support in a securing position.

16. The wind stop device as defined in claim 15, wherein the securing position is located beyond a dead center with respect to pivoting positions of frame sections of the support pivotable relative to one another.

17. The wind stop device as defined in claim 15, wherein the support is lockable in the securing position.

18. The wind stop device as defined in claim 17, further comprising:
    a stop element for locking the support in the securing position;
    said stop element being adapted to couple moveable sections of a frame structure of the support into an essentially unmoveable condition.

19. The wind stop device as defined in claim 18, wherein the stop element comprises a hinged cover flap.

20. The wind stop device as defined in claim 18, wherein the stop element comprises a sliding stop member.

21. The wind stop device as defined in claim 11, wherein one or more struts are provided between an upper frame section and a lower frame section of the frame structure.

22. The wind stop device as defined in claim 21, wherein at least one of said struts is a supporting strut comprising a swivel shaft of a swivel joint for varying a length of the support.

23. The wind stop device as defined in claim 21, wherein supporting struts are located in an area of curved sections of the wind stop device when the wind stop device is assembled.

24. The wind stop device as defined claim 1, wherein:
    the roll bar comprises first and second spaced curved elements; and
    the support comprises a first supporting structure adapted to be secured on the first curved element and a second supporting structure adapted to be secured on the second curved element.

25. The wind stop device as defined in claim 24, wherein a surface element of the wind stop device for an associated curved element is held by a supporting structure.

26. The wind stop device as defined in claim 24, wherein a support for surface elements of the wind stop device in a space between the curved elements is adapted to be secured between the first supporting structure and the second supporting structure.

27. The wind stop device as defined in claim 26, wherein the surface element of the wind stop device for the space between the curved elements is disk-like.

28. The wind stop device as defined in claim 24, wherein a supporting structure has oppositely located holding brackets for securing it on the associated curved element.

29. The wind stop device as defined in claim 28, wherein a holding bracket is provided with a groove for receiving a support for surface elements of the wind stop device.

30. The wind stop device as defined in claim 29, wherein the groove and associated support are adapted to limit the downward displacement of the support when assembled on the roll bar.

31. The wind stop device as defined in claim 26, further comprising a locking device for limiting upward displacement of an assembled support.

32. The wind stop device as defined in claim 26, wherein the supporting structures and support are adapted for assembly on the roll bar with associated surface elements of the wind stop device lying flush in a single plane.

* * * * *